3,137,706
PREPARATION OF CYCLIC AROMATIC
CARBONATES
Robert J. Prochaska, Interlaken, Mass., assignor to
General Electric Company, a corporation of New York
No Drawing. Filed Apr. 4, 1962, Ser. No. 184,940
10 Claims. (Cl. 260—340.2)

This invention relates to aromatic carbonates and more particularly relates to a new and improved process for preparing cyclic aromatic carbonate monomers from linear high molecular weight carbonate polymers.

Cyclic carbonates have been known and studied for many years since ethylene carbonate was first prepared by Nemirowski in 1883 [J. Prakt. Chem. (2) 28, 439 (1883)]. This stable, crystalline solid has been definitely established to be the 5-membered ring compound. In 1898, Einhorn [Ann. 300, 135 (1898)] prepared a cyclic carbonate from catechol and phosgene. This simple 5-membered cyclic aryl carbonate and similar compounds prepared from substittuted catechols are the only cyclic aryl carbonates reported in the literature. They are, however, highly stable monomers incapable of being polymerized to form high molecular weight polycarbonates. In 1930, Carothers and Natta [JACS 52, 314–26 (1930)] prepared the 6-membered cyclic trimethylene carbonate and succeeded in isolating the cyclic dimeric tetramethylene carbonate. This work was continued by Carothers, Dorough and Natta [JACS 54, 761–772 (1932)] in a study of the reversible polymerization of 6-membered cyclic esters, including cyclic aliphatic carbonates. They had concluded at the time that any attempt to prepare cyclic esters having more than 6 atoms in the ring from open chain polymeric compounds led to linear polymers. In 1933, Hill and Carothers (JACS 55, 5031–39 1933)] succeeded in preparing many cyclic aliphatic carbonates by depolymerizing the corresponding polymers under a vacuum. However, they were unable to prepare any monomeric cyclic carbonates having 7 or 8 atoms in the ring by their depolymerization technique.

In my copending application, Serial No. 161,306, filed December 21, 1961 and assigned to the same assignee as the present invention, there is disclosed a new class of aromatic cyclic carbonate monomers which may be polymerized to provide high molecular weight aromatic carbonate polymers. Generally speaking, these cycle carbonate monomers are 7 and 8 membered ring compounds corresponding to the general formula (I)

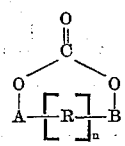

wherein A and B are aromatic radicals, R is attached to A and B ortho relative to the respective oxygen atoms and is selected from the group consisting of an alkylidene group, a sulfone group, a carbonyl group, a sulfoxy group, sulfur, and oxygen; and $n$ is a whole number from 0 to 1. Such aromatic cyclic carbonate monomers may be easily and conveniently converted to high molecular weight carbonate polymers by heating these cyclic monomers in the presence of a catalyst, such as an alkali metal or an alkali metal hydroxide, for example. Other suitable catalysts which may be used, as well as specific methods for polymerizing these aromatic cyclic carbonate monomers to provide high molecular weight aromatic polymers, are disclosed in my above referred to copending application.

As far as I am aware, cyclic carbonate monomers having 7 or 8 atoms in the ring, such as those falling within the scope of Formula I above have not been prepared from high molecular weight linear carbonate polymers.

I have now discovered a process for preparing these valuable cyclic carbonate monomers from the corresponding carbonate polymers. Briefly stated, the process of this invention comprises heating, under vacuum, a carbonate polymer containing recurring structural units of the formula (II)

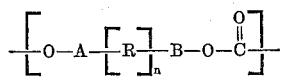

to distill a cyclic carbonate monomer of the formula

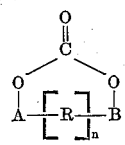

wherein A and B are aromatic radicals, such as phenyl, diphenyl, naphthyl; R is attached to A and B ortho relative to the hydroxyl groups and is selected from the class consisting of an alkylidene group such as methylene, ethylidene, propylidene, butylidene; a sulfone group; a carbonyl group; a sulfoxy group; sulfur; and oxygen; and $n$ is a whole number from 0 to 1.

Unexpectedly, I have discovered that when a carbonate polymer having recurring structural units corresponding to Formula II above (i.e., a carbonate polymer in which the aromatic radicals are linked through ortho positions to form the linear chain) is vacuum distilled, a cyclic carbonate monomer of the type falling within the scope of Formula I is produced. On the other hand, if aryl carbonate polymers in which the aromatic radicals are linked through para or meta positions to form linear chains are vacuum distilled, the expected linear decomposition products (such as phenols) are obtained.

The temperature at which the carbonate polymer having recurring structural units falling within the scope of Formula II above may be heated, and the degree of vacuum necessary to effectuate a distillation of the cyclic carbonate monomer in accordance with the present invention will vary with the type of polymer employed, or more accurately, with the type of cyclic monomer to be distilled. In general, pot temperatures ranging from at least about 250° C. to over 350° C. may be employed, although these temperatures may be lowered if a small, i.e., a catalytic amount of a depolymerization catalyst is employed. Examples of suitable catalysts are potassium carbonate, sodium carbonate and the chlorides or carbonates of metals such as tin, manganese, magnesium, iron and cobalt. Such catalysts are advantageously employed in cases where extremely high temperatures, i.e., in excess of 350° C., are required in order to effect depolymerization. In instances where the cyclic carbonate monomers are distilled at pot temperatures of 280–300° C., the use of such catalysts may be entirely obviated, however.

The degree of vacuum required to effect depolymerization will also vary within wide limits. In general, a vacuum of the order of about 50 mm. of mercury and preferably less than 20 mm. of mercury is advantageously employed.

In order that those skilled in the art may better understand how the present invention may be practiced, the following examples are given by way of illustration and not by way of limitation. All parts and percentages are by weight unless otherwise noted. The molecular weight determinations were made by the measurement of the depression of the freezing point of benzene. Values within ±12% of the calculated molecular weight of any particular cyclic carbonate were deemed to be in the acceptable range of experimental error involved in such molecular weight determinations.

*Example 1*

A high molecular weight aromatic carbonate polymer having recurring structural units of the formula

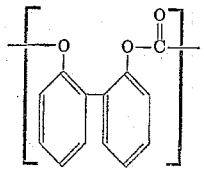

was prepared by admixing 93 parts of 2,2'-dihydroxybiphenyl with 110 parts of diphenyl carbonate, and heating the mixture to 220° C. and then gradually to about 280° C. as phenol distilled from the reaction mixture. The resulting high molecular weight carbonate polymer was vacuum distilled (full aspirator vacuum) at a pot temperature of 260–280° C. to yield a pale yellow distillate which completely crystallized upon cooling. It was recrystallized twice from carbon disulfide to yield a white solid, melting point 101–102° C. On infrared analysis, this solid did not absorb in the hydroxyl region but showed a strong carbonyl absorption in the carbonate region. This information, coupled with the following analytical data, confirmed the identification of the solid as the cyclic monomeric 2,2'-(diphenyl) carbonate:

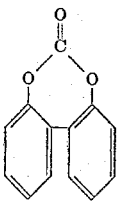

| | Found | Calculated |
|---|---|---|
| Carbon (percent) | 73.56 | 73.58 |
| Hydrogen (percent) | 3.71 | 3.80 |
| Molecular Weight | 216 | 212 |

*Example 2*

A high molecular weight carbonate polymer having recurring structural units of the formula

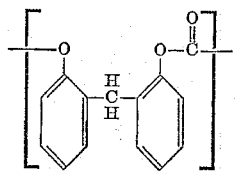

was prepared by admixing 20 parts of 2,2'-dihydroxydiphenylmethane with 25 parts of diphenyl carbonate and treating the mixture as in the previous example. The resulting high molecular weight polymer was vacuum distilled at 0.15 mm. Hg at a pot temperature of from 265 to 305° C. The pale yellow distillate crystallized upon standing. The solid was found to sublime readily at 65–85° C. at 0.15 mm. Hg. After recrystallization from hexane, a white solid, melting point 101–102° C. was obtained. On infrared analysis, this solid did not absorb in the hydroxyl region but showed a strong carbonyl absorption in the carbonate region. This information, coupled with the following analytical data, confirmed the identification of the solid as the cyclic monomeric 2,2'-(diphenylmethane) carbonate

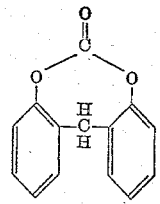

| | Found | Calculated |
|---|---|---|
| Carbon (percent) | 73.96 | 74.32 |
| Hydrogen (percent) | 4.68 | 4.46 |
| Molecular Weight | 218 | 226 |

*Example 3*

A high molecular weight carbonate polymer having recurring structural units of the formula

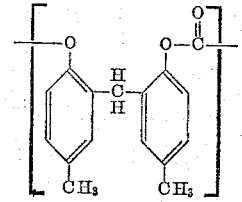

was prepared by admixing 145 parts of 2,2'-dihydroxy-5,5'-dimethyldiphenylmethane with 150 parts diphenyl carbonate and treating the mixture as in Example 1. A trace of solid potassium carbonate was added to the high molecular weight polymer thus formed and the reaction mixture flash distilled at 0.1 mm. Hg at a pot temperature of 250° C. The distillate came over as a viscous yellow oil which crystallized to a white solid when mixed with hexane. After three recrystallizations from hexane, this solid (melting point 149–150° C.) showed no absorption in the hydroxyl region but showed strong absorption in the carbonate region on infrared analysis. This information, coupled with the following analytical data, confirmed the identification of the solid as the cyclic monomeric 2,2'-(5,5'-dimethyldiphenylmethane) carbonate

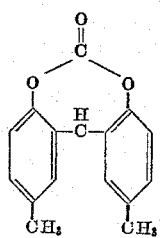

| | Found | Calculated |
|---|---|---|
| Carbon (percent) | 76.01 | 75.57 |
| Hydrogen (percent) | 5.75 | 5.55 |
| Molecular Weight | 236 | 254 |

The aromatic carbonate polymers which may be depolymerized to provide aromatic cyclic carbonate monomers in accordance with the present invention may be prepared by any of the well known polycarbonate forming reactions as, for example, by reacting an ortho bisphenol with a carbonate precursor such as an aromatic or an aliphatic carbonate ester, or a carbonyl halide in the presence of a strong base such as sodium hydroxide. These polymers may also be prepared by polymerizing the aromatic cyclic carbonate monomers of the type disclosed in my copending application Serial No. 161,306 referred to above.

The term ortho bisphenol as used herein is meant to embrace within its scope dihydric phenols corresponding to the formula:

(III)
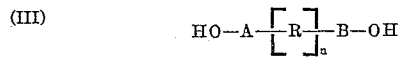

wherein:

A and B are aromatic radicals, R has the meaning given above, and is attached ortho relative to the respective hydroxyl groups, and $n$ is a whole number between 0 and 1.

A particularly preferred class of aromatic carbonate polymers which may be depolymerized to provide aromatic cyclic carbonate monomers in accordance with this invention are those prepared from ortho bisphenols falling within the scope of the formula:

(IV)
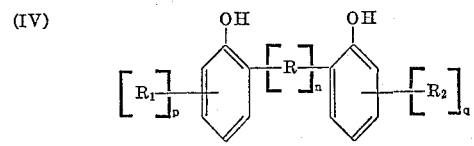

wherein R has the meaning given above, $R_1$ and $R_2$ are radicals selected from the group consisting of alkyl radicals, such as methyl, ethyl, butyl, propyl, isopropyl; aralkyl radicals, such as benzyl, phenylethyl; halogen atoms, such as fluorine, chlorine, bromine; sulfone radicals; nitro radicals; alkoxy radicals, such as methoxy, ethoxy; $n$ is a whole number between 0 and 1; and $p$ and $q$ are whole numbers from 0 to 4. Mixtures of the radicals identified by $R_1$ or $R_2$ may also be used.

Specific examples of ortho bisphenols falling within the scope of Formulae III and IV above are, for instance, 2,2'-dihydroxydiphenyl; 2,2'-dihydroxydiphenylmethane; 2,2'-dihydroxy-5,5'-dimethyldiphenylmethane; 2,2-(2,2'-dihydroxy-5,5'-dimethyldiphenyl) propane; 2,2-(2,2'-dihydroxy-4,4'-dimethyldiphenyl) propane; 2,2'-dihydroxy-5,5'-dichlorodiphenylmethane; 2,2'-dihydroxy-3,3',5,5'-tetramethyldiphenylmethane; 2,2'-dihydroxy-3,3',di-t-butyl-5,5'-dimethyldiphenylmethane; 2,2-bis (2-hydroxyphenyl) propane and 2,2'-dihydroxy-5'-chlorodiphenylmethane.

It will be appreciated by those skilled in the art that carbonate polymers prepared from any of the foregoing ortho bisphenols will contain recurring structural groups corresponding to the formula

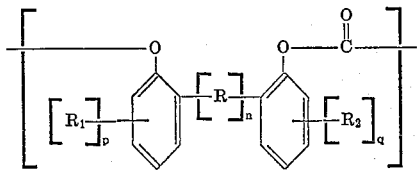

where R, $R_1$, $R_2$, $n$, $p$ and $q$ all have the meanings given above.

A major advantage of the present invention is that highly useful cyclic carbonate monomers may be recovered from scrap resins, such as, for example, obtained when extruding or molding parts from high molecular weight aromatic carbonate polymers of the type obtained from ortho bisphenols. Heretofore, such scrap resin material was discarded due primarily to the expense involved in the purification necessary for reuse. By virtue of this invention, however, such scrap material may simply and economically be processed to provide the cyclic carbonate monomers which may then be reconverted to high molecular weight carbonate polymers by the method disclosed in my above referred to copending application.

The polycarbonate resins prepared from the cyclic carbonate monomers obtained in accordance with the present invention have utility in the same applications as previously known aromatic carbonate polymers. For example, they are useful in the manufacture of films, fibers, molded or extruded parts, and in the preparation of surface coatings for use in structural, decorative, and electrical applications.

What I claim as new and desire to secure by Letters Patent of the United States is:

1. A process for preparing an aromatic cyclic carbonate monomer which process comprises heating, under vacuum, a carbonate polymer comprising recurring structural units of the formula

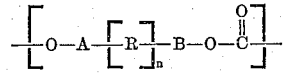

to distill a cyclic carbonate monomer of the formula

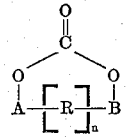

wherein A and B are aromatic radicals, R is attached to A and B ortho relative to the respective oxygen atoms and is selected from the group consisting of an alkylidene group, a sulfone group, a carbonyl group, a sulfoxy group, sulfur, and oxygen; and $n$ is a whole number from 0 to 1.

2. The process of claim 1 where R is an alkylidene group.
3. The process of claim 1 where R is a sulfone group.
4. The process of claim 1 where R is a carbonyl group.
5. The process of claim 1 where R is a sulfoxy group.
6. The process of claim 1 where R is a sulfur atom.
7. The process of claim 1 where R is an oxygen atom.
8. A process for preparing cyclic 2,2'-(diphenyl) carbonate which process comprises heating, under vacuum, a carbonate polymer containing recurring structural units of the formula

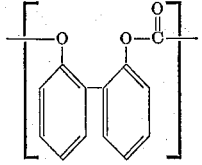

to distill the cyclic 2,2'-(diphenyl) carbonate.

9. A process for preparing cyclic 2,2'-(diphenylmethane) carbonate which process comprises heating, under vacuum, a carbonate polymer containing recurring structural units of the formula

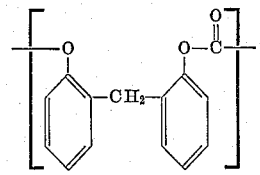

to distill the cyclic 2,2'-(diphenylmethane) carbonate.

10. A process for preparing cyclic 2,2'-(5,5'-dimethyldiphenylmethane) carbonate which process comprises heating, under vacuum, a carbonate polymer containing recurring structural units of the formula

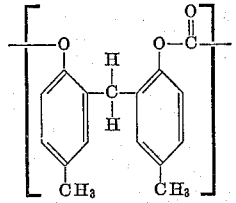

to distill the cyclic 2,2'-(5,5'-dimethyldiphenylmethane) carbonate.

References Cited in the file of this patent

UNITED STATES PATENTS

| | | |
|---|---|---|
| 2,020,298 | Carothers et al. | Nov. 12, 1935 |
| 3,072,613 | Whelan et al. | Jan. 8, 1963 |